Sept. 14, 1954    C. R. ADAIR    2,688,910
SUBSOIL PLOW
Filed Jan. 27, 1951    2 Sheets-Sheet 1
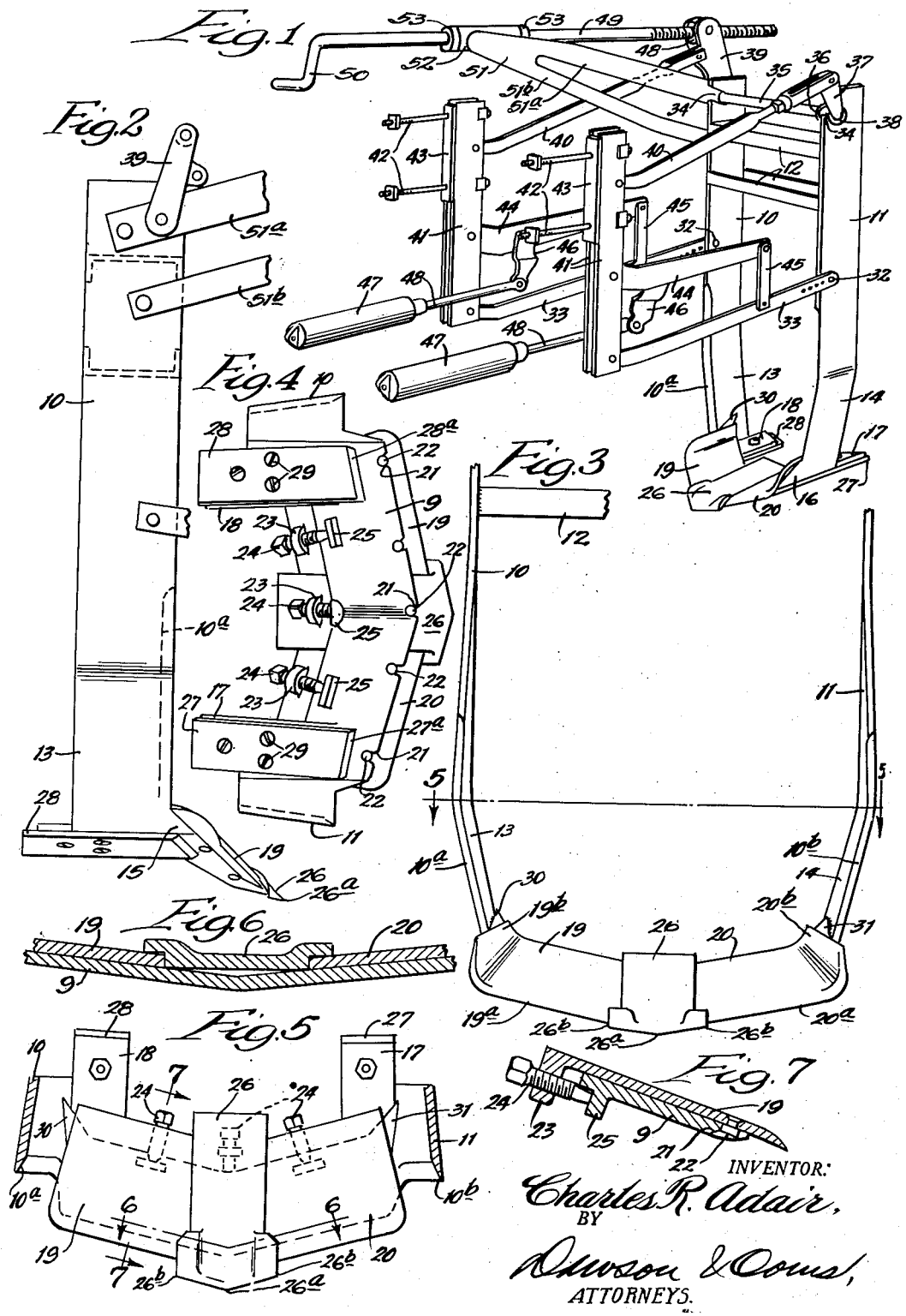
INVENTOR:
Charles R. Adair,
BY
Dawson & Ooms,
ATTORNEYS.

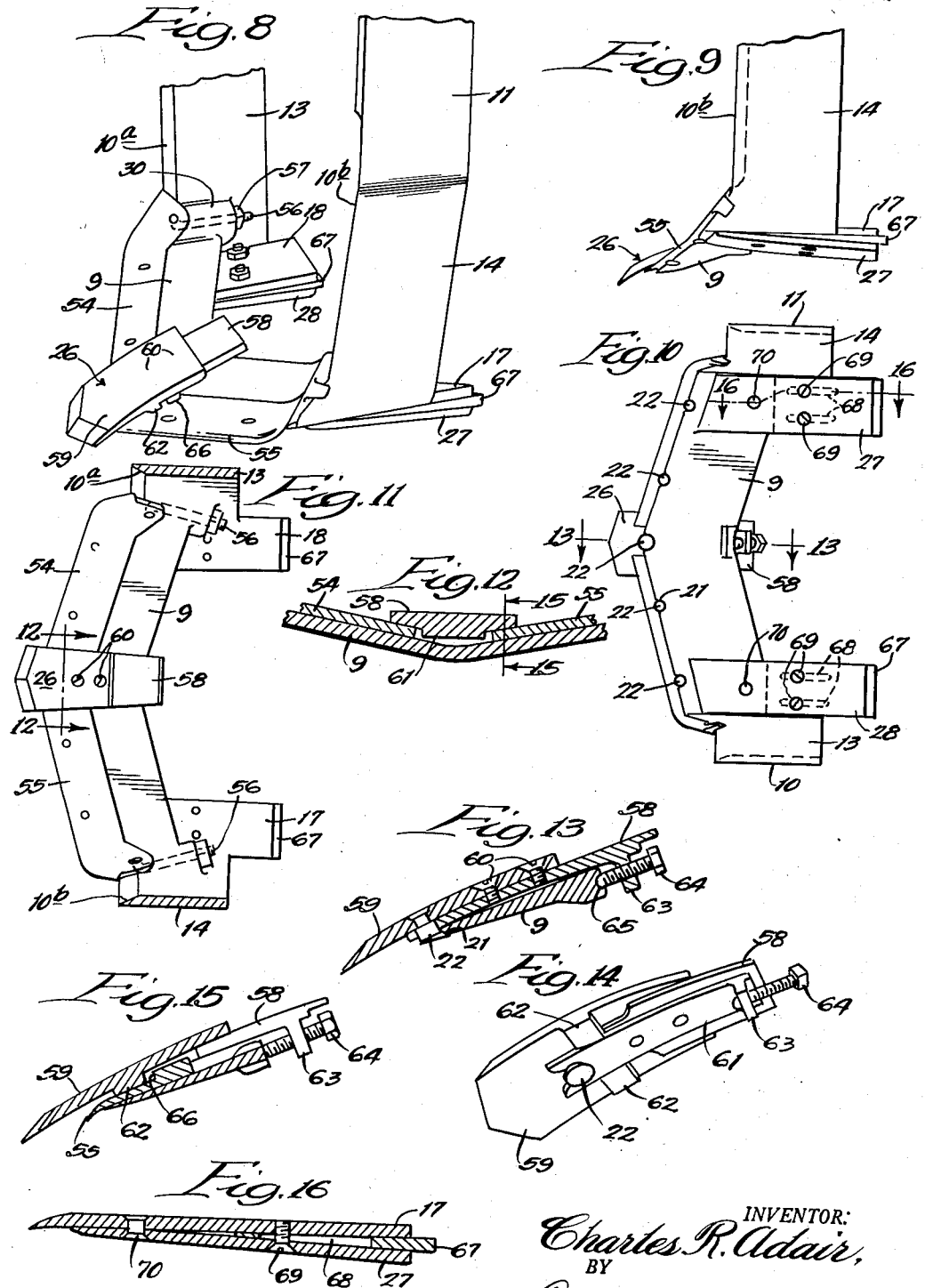

Patented Sept. 14, 1954

2,688,910

UNITED STATES PATENT OFFICE 2,688,910

SUBSOIL PLOW

Charles R. Adair, Chicago Heights, Ill.

Application January 27, 1951, Serial No. 208,198

7 Claims. (Cl. 97—78)

My invention relates to a sub-soil plough. My sub-soil plough is particularly useful when it is desired to shatter the sub-soil without turning the surface soil or bringing any of the sub-soil to the surface. This application is a continuation-in-part of my application U. S. Ser. No. 70,976, filed January 14, 1949, for Digger Apparatus.

For a considerable period of time an acute need has been felt for a plough which would break up the sub-soil and render it more porous. This need has been felt in connection with various special soil problems. One such problem is that over a large part of the midwestern prairies the surface soil or top soil is only a few inches thick and then shades gradually into the underlying sub-soil. This sub-soil is generally composed of a tough clay and is tight, heavy and hard to manage. Water goes through such sub-soil very slowly; and as a result, flat land stays wet and water runs quickly off the slopes, carrying good top soil with it.

A still wider need for a means for breaking up the sub-soil has been felt because of the so-called plough sole, which is a hardening of the soil produced by the lower part of the plough blade in normal ploughing operations. Also, it is frequently found that uncultivated land such as grazing land is not sufficiently water absorptive because of the tightness of the sub-soil.

Thus, it can be seen that there has been a widely felt need for a plough to render the sub-soil more porous. However, the only type of plough which has been provided for accomplishing this result consists of a chisel having a shank attached thereto and a long draw bar. This chisel-type plough has been used by making a series of gashes in the soil in order to plough up the sub-soil. Such a method of sub-soil ploughing, however, is unsatisfactory since it brings the sub-soil to the surface, and only breaks up a small portion of the the sub-soil. Moreover, it has been found that such ploughing is time consuming and expensive since a relatively large amount of power is required to pull a chisel-type plough.

Therefore, it is an object of my invention to provide a sub-soil plough which can be used to break up all of the sub-soil when desired without bringing the sub-soil to the surface or turning the surface soil. It is another object of my invention to design a sub-soil plough which can be effectively used without requiring an undue amount of power which would make the ploughing operation too expensive for the value obtained. It is a further object of my invention to design a plough which will raise and lower a section of the sub-soil and thereby shatter the sub-soil and render it more porous. It is a still further object of my invention to produce an implement for sub-soil ploughing which is composed of thin pieces of metal, and therefore easily pulled through the ground without sacrificing the strength or the wearing qualities of the plough. It is another object of my invention to design a sub-soil plough having an easy and accurate means of depth adjustment. Further objects and advantages will appear as the specification proceeds.

I have discovered that the above objects can be substantially accomplished by providing a plough in which the plough body consists of facing plates extended and turned to provide a rectangular U-shaped frame, and by attaching a wide V-shaped cutter inclined inwardly and downwardly on the bottom of the rectangular frame. I have also made many important discoveries as to the important details of construction of such a plough which will subsequently be set out.

The sub-soil plough of my invention is shown in an illustrative embodiment in the accompanying drawings, in which—

Figure 1 is a perspective view of my sub-soil plough together with drawing attachments and adjusting means; Fig. 2, a fragmentary side view in elevation of the plough shown in Fig. 1; Fig. 3, a fragmentary front view of my plough showing the detachable cutter plates; Fig. 4, a bottom view of my plough showing the heel plates and method of connecting the cutter plates to the base plate; Fig. 5, a plan view of the V-shaped cutter seen from the bottom in Fig. 4; Fig. 6, a front cross-sectional view of the cutter plates taken in elevation on line 6—6 of Fig. 5; Fig. 7, a side cross-sectional view of one of my cutter plates taken in elevation on line 7—7 of Fig. 5; Fig. 8, a perspective view of the bottom of my plow showing a modification in the cutter plates mounting and in the heel plates; Fig. 9, a side view of the modified form of my plough shown in Fig. 8; Fig. 10, a bottom view of the same modifications; Fig. 11, a top view of these modifications; Fig. 12, a fragmentary front cross-sectional view taken in elevation on line 12—12 of Fig. 11 showing the relationship between the cutter plates and the central shoe; Fig. 13, a side cross-sectional view taken in elevation on line 13—13 of Fig. 10 showing the means of attaching the central shoe to the base plate; Fig. 14, a perspective view of the bottom of the modified form of the central shoe; Fig. 15, a side cross-sectional view taken in elevation on line 15—15 of Fig. 12 showing the clamping cooperation between the central shoe and the cutter plates; and Fig. 16, a side cross-sectional view of the heel plate assembly taken on line 16—16 of Fig. 10 showing the adjustment modification.

Referring now to the drawings and especially to Fig. 1 thereof, it will be seen that my sub-soil plough has two side plates or members 10 and 11, which are secured in facing position by bracing at the top thereof. In the illustration given, the bracing consists of two headers 12 formed from channels. It will be apparent that such bracing can take different forms while still maintaining side plates 10 and 11 in facing position. Plates 10 and 11 are preferably formed from relatively thin pieces of steel in order that they may be easily drawn through the ground.

In the illustration given, side plates 10 and 11 have bottom portions 13 and 14 which are turned inwardly. I prefer to have bottom turned portions 13 and 14 equipped with forwardly extending triangular portions 15 and 16 to assist in supporting the base plates. To the bottom edges of side members 10 and 11, I prefer to secure a base or plate 9, as shown best in Figs. 4 and 6. Base plate 9 is V-shaped and is attached to side members 10 and 11 so as to extend downwardly and forwardly therefrom.

Beneath base plate 9, I secure heel plate support flanges 17 and 18. Flanges 17 and 18 are attached to the lower edges of side plates 10 and 11 and aligned so as to form a right angle with the vertical edges of side plates 10 and 11.

The structure thus far described comprises a substantially complete sub-soil plough, which can be used satisfactorily by sharpening the forward edge of base plate 9 and providing means for drawing the plough while holding side members 10 and 11 in an upright position. I have found it important, however, to utilize detachable cutter plates and heel plates which can be easily replaced when they become worn. In the embodiment shown, cutter plates 19 and 20 are secured on top of base plate 9. Cutter plates 19 and 20 have sharpened forward edges 19a and 20a which extend downwardly and forwardly of base plate 9. I prefer to have the outer ends of cutters 19 and 20 turned upwardly as designated by 19b and 20b.

Various methods can be used for detachably securing cutters 19 and 20 to base plate 9. In the illustration given, I provide slots 21 in the forward edge of plate 9. The lower portion of these slots is preferably beveled. Lugs 22 are attached to the under surface of plates 19 and 20, and preferably have a beveled head portion to engage the beveled portion of slot 21, as shown more clearly in Fig. 7. To the rear of cutters 19 and 20 I provide lugs 23 which have bolts 24 threaded into them. I also attach lugs 25 along the rear of base plate 9 so as to engage bolts 24 when they are secured forwardly. Lugs 25 preferably have indentations to receive the ends of bolts 24 and thereby securely lock cutters 19 and 20 to base plate 9.

Although cutters 19 and 20 can be used alone, I prefer to provide a central shoe or cutter point 26 which has a forward cutting edge 26a extending somewhat in front of cutting edges 19a and 20a. I have found it desirable to equip shoe 26 with lateral portions 26b which are adapted to overlie cutters 19 and 20 at their forward edges. Overlapping portions 26b tend to prevent soil from being caught between shoe 26 in cutters 19 and 20. As seen more clearly in Fig. 4, shoe 26 is attached to base plate 9 by means of lug 22 engaging slot 21 and bolt 24 threadedly guided in lug 23 and engaging lug 25. It will be seen that this method of detachably fastening shoe 26 is the same as that used for cutters 19 and 20.

Beneath support flanges 17 and 18, I detachably secure heel plates 27 and 28 by means of bolts 29. While I prefer to have heel plates 27 and 28 and support flanges 17 and 18 lying in the same plane, the important thing is that heel plates 27 and 28 be aligned so that their bottom surface is parallel with the directly adjacent cutting edge of cutters 19 and 20. I also prefer to align heel plates 27 and 28 with respect to side plates 10 and 11 so that heel plates 27 and 28 will be at the same depth as the directly adjacent cutting edges of cutters 19 and 20. If desired, the forward edges 27a and 28a of heel plates 27 and 28 can be beveled as seen in Fig. 4 and elsewhere in the drawings. I also prefer to bevel the lower forward edges 10a and 10b of plates 10 and 11.

In addition to the structure thus far described, I have discovered that it is important to locate fillet or gusset plates 30 and 31 in the corners formed by side plates 10 and 11 and base plate 9. Gusset plates 30 and 31 provide support for the upwardly turned edges 19b and 20b of cutters 19 and 20, but primarily to assist the movement of earth through the plough. In order to prevent the crowding of the cut I prefer to have the rear edges of side portions 13 and 14 slightly closer together than the front edges. This tends to make the cut slightly wider than the thickness of side members 10 and 11, and is particularly important when the plough is turned without removing it from the ground.

I prefer to draw my plough through the ground with side members 10 and 11 in an upright position by means of drawing linkages similar to those shown in Fig. 1. At an intermediate point on side members 10 and 11 I provide holes 32 to serve as connection points for draw bars 33. Near the top of side plates 10 and 11, slots 34 can be provided to receive depth control shaft 35. As viewed in Fig. 1 the right end of depth control shaft 35 is rotatably secured within slots 34 by means of a U-shaped clamp 36. On the outside of member 11 toggle arm 37 is rigidly secured to the end of depth control shaft 35. If desired, a washer 38 can be located on rod 35 between toggle arm 37 and side member 11. A larger toggle arm 39 is rigidly secured to the other end of rod 35 on the outside. Thrust bars 40 are pivotally secured to toggle arms 37 and 39, and together with draw bars 33 are extended forwardly to be pivotally secured to connecting posts 41. In the illustration given, connecting posts 41 are equipped with threaded bolts 42 which provide for the clamping of shims 43 between connecting post 41 and tractor axle housing.

In order to provide for the raising and lowering of the plough, lifting booms 44 are pivotally secured to post 41 between draw bars 33 and thrust bars 40. Lifting booms 44 have links 45 pivotally attached to their other ends. Links 45 extend downwardly toward draw bars 33 at a point between side members 10 and 11 and post 41, and are pivotally connected to draw bars 33. Brackets 46 are rigidly connected to lifting booms 44 so as to extend downwardly therefrom between post 41 and links 45. The lower ends of brackets 46 are adapted to be connected to the hydraulic cylinders of a tractor designated as 47 in Fig. 1.

The upper end of large toggle arm 39 is equipped with a threaded lug 48. A rod 49 having a threaded end portion is received within lug 48. In the illustration given, rod 49 is equipped with a crank 50 on the forward end thereof to assist in turning rod 49. It will be apparent that other turning adaptations can readily be used. A support 51 for rod 49 is attached to side member 10. In the embodiment shown, support 51 is V-shaped having arms 51a and 51b. Both arms 51a and 51b are rigidly secured to side member 10. If desired, arm 51a can extend between toggle arm 39 and side member 10 having an opening therethrough for turning rod 35. Adjacent the outer end of support arm 51, rod 49 is equipped with a sleeve 52 within which rod 49 is free to turn. The adjacent end of support 51 is rigidly secured to the exterior of sleeve 52. If desired, collars 53 can be rigidly secured to rod 49 so as to abut the ends of sleeve 52 and thereby restrain the longitudinal movement of rod 49 within sleeve 52. If desired, a thrust bearing may be used between collar 53 and sleeve 52 to reduce friction.

*Operation*

My sub-soil plough can be conveniently used with the drawing linkages shown in Fig. 1. These linkages provide a convenient means for allowing the plough to be adjusted for depth or to be raised and lowered in the ground by means of hydraulic cylinders. Connecting posts 41 are fastened to the frame of a tractor by means of shims 43 and bolts 42. In some models of tractors, hydraulic cylinders 47 are provided on the sides of the tractor, and the piston rods within the cylinders can readily be connected to brackets 46. From an inspection of Fig. 1, it will be readily apparent that the movement of piston rods 48 to the rear will cause lifting booms 44 to be raised and thereby side members 10 and 11 will be raised. Conversely, when piston rods 48 are moved forwardly, lifting booms 44 are lowered, which will thereby cause the plough to be lowered.

In my plough structure, the relationship between the forward edge of the V-shaped cutter and particularly the forward edge of the central shoe and the bottom surface of the heel plates is extremely important in achieving proper regulation of the depth of cut. Preferably, the heel plates are positioned at the same depth and inclination as the portions of the forward edge of the cutter immediately in front of the heel plate. In this position, the heel plates ride on the bottom of the cut or furrow, while the side members are in an upright position.

To change the depth adjustment of the plough, the length of thrust bars 40 is varied by rotating turning rod 49 by means of crank 50 to actuate toggle arms 37 and 39. Varying the length of thrust bars 40 varies the inclination of side members 10 and 11 when the cutter is above ground. As the plough is drawn forwardly, the cutter sinks into the ground and the plough gradually swings to an upright position until the selected depth is reached at which the heel plates are on the bottom of the furrow and therefore hold the plough at that depth.

In operation, my plough is lowered by means of hydraulic cylinders 47 and is adjusted for proper depth of cut by means of crank 50. The plough is then pulled into the ground until it assumes an upright position with the heel plates on the bottom of the furrow. In this position, it will maintain the depth of cut when pulled through the ground. While pulling the plough through the ground, the soil is made to pass over the V cutter and between side plates 10 and 11. The ploughed portion of the soil is thus raised and allowed to fall a distance of three to four inches, which causes it to be shattered without turning the top soil or bringing the sub-soil to the surface. It will be noted that in this operation, all of the displacement of the soil is in a vertical direction, which is very important in achieving a light draft.

I have found that my plough is relatively easy to pull and that the soil does not readily pack or clog between sides 10 and 11. The raising and lowering of the soil by means of the upward and inward inclination of the V cutter tends to prevent the packing of the soil so as to clog the plough. Gusset plates 30 and 31 are also important in preventing my plough from becoming clogged with soil. The rectangular shaped configuration of my plough provides a strong structure even though plates 10 and 11 are made of relatively thin metal. It will be apparent that gusset plates 30 and 31 also serve to give added mechanical strength to the cutter support portion of my plough.

Another problem which has arisen in connection with the construction of my sub-soil plough is how to construct the cutter plates and central shoe ruggedly enough to prevent them being damaged by striking rocks, etc., while having their wearing surfaces cheaply replaceable. Along this same line, there arises the problem of how to attach the relatively thin replaceable wearing members so that they can be easily attached and detached, but will not become loosened while the plough is in use. A still further problem which has arisen is that the wearing of the forward edges of the cutter plate and central shoe require that a means be provided for adjusting the angular relation of the heel plates in order to properly regulate the depth of cut.

I have found that the above problems can be substantially solved by the modifications in the structure of my sub-soil plough shown in Figs. 8 to 16 in the drawings. Therefore from the standpoint of economical replacement of the cutting surfaces when they become worn, means of securing the cutters and the central shoe to the base plate, and regulation of depth of cut, the modification shown represents improvements over the structure shown in Figs. 1 to 7. These modifications will now be described.

I have discovered that it is possible to modify the fully overlapping cutter plates 19 and 20 to narrow cutter plates 54 and 55, as shown more clearly in Figs. 8 and 11. Narrow cutter plates 54 and 55 overlap only the forward portion of base plate 9, extending along the forward edge of base plate 9 from fillet plates 30 and 31 downwardly. I prefer that plates 54 and 55 do not meet in the center but rather have a space therebetween as seen more clearly in Figs. 10 and 12.

In the illustration given, plates 54 and 55 have their under surface equipped with the lugs 22 which have been previously described in connection with cutter plates 19 and 20. Lugs 22 engage slots 21 and thus prevent any rearward movement of plates 54 and 55. In addition, the upper ends of cutter plates 54 and 55 are apertured to receive the hook end of J-shaped bolts 56, which are loosely inserted within openings in or beneath fillet plates 30. The rearward ends of J bolts 56 are threaded to receive nuts 57. The tightening of nuts 57 cause cutter plates to be pulled rearwardly and restrained at the upper ends against forward motion.

However, bolts 56 and lugs 22 cannot prevent the forward sliding or downward tilting of cutters 54 and 55 at the center of base plate 9. The means for preventing this motion will be described in connection with the modification in central shoe 26.

In the illustration given, central shoe 26 is modified to provide a laminated construction. Specifically, central shoe 26 as shown is composed of a support shoe 58 and a shoe point 59. These members are secured together by means of bolts 60. As seen more clearly in Fig. 12 support shoe 58 has a depending rectangular portion 61 adapted to lie between the inner ends of cutter plates 54 and 55 above base plate 9.

As seen more clearly in Figs. 8 and 15 shoe point 59 has a depending lug 62 on each side of the underside thereof which is designed to flatly abut the upper surfaces of cutter plates 54 and 55. Also, support shoe 58 is equipped at its rear with a depending lug 63 having a threaded aperture therethrough. Bolt 64 is received within this aperture and adapted to engage indentation 65 on the rear of base plate 9 as shown more clearly in Fig. 13.

In the illustration given and preferably, support shoe 58 and shoe point 59 are bowed downwardly to provide clearance so that the beveled head of lug 22 can be wedged into solt 21 when bolt 64 is tightened within indentation 65. This causes clamping lugs 62 to be pressed downwardly against cutter plates 54 and 55; thus tightly clamping these plates and preventing them from turning downwardly. In order to prevent any chance of cutter plates 54 and 55 moving forwardly, retaining lugs 66 are provided on the upper inner ends of cutter plates 54 and 55 as seen more clearly in Figs. 8 and 15. Clearance is provided between clamping lugs 62 and retaining lugs 66 in order that the central shoe 26 can be tightly clamped even though slot 21 and indentation 65 have become worn. Preferably, clearance is also provided between the upper surface of retaining lugs 66 and the under surface of shoe point 59 to facilitate clamping.

As previously pointed out the planar relationship between the heel plates 27 and the forward edges of the cutters and central shoe is important to achieve proper depth regulations. Therefore, I prefer to provide means for slightly adjusting the position of heel plates 27 and 28. In the illustration given, wedges 67 are slidably mounted between heel plate support flanges 17 and 18 and heel plates 27 and 28. As seen more clearly in Figs. 10 and 16 wedges 67 have slots 68 to receive bolts 69. Thus, wedges 67 can be moved inwardly or outwardly between the support flanges and the heel plates to change the elevation of heel plates 27 and 28. Heel plates 27 and 28 are prevented from forward or backward movement during the adjustment of wedges 67 by means of pins 70.

While in the foregoing specification, I have set forth certain structures in considerable detail for the purpose of illustrating single embodiments of the invention, it will be understood that such details may be varied widely by those skilled in the art without departing from the spirit of my invention.

I claim:

1. In a sub-soil plough, the combination comprising two side plates secured in facing relation by bracing at the top of said plates, a V-shaped support plate inclined downwardly and inwardly connected to and extending between the bottom portions of said side plates, a narrow cutter plate detachably secured on each side of said support plate and overlapping the forward portion thereof, said plates being secured at their upper ends against forward movement and to the forward edge of said support plate against rearward movement, and a downwardly-bowed shoe member providing a forwardly extending point, said shoe member overlapping the inner edge portions of said cutter plates and clamping said cutter plates to said support plates by downwardly extending lug means, said shoe member also being attached to the rear of said support plate and exerting a downward clamping force through said lug means on said cutter plates.

2. In a sub-soil plough, the combination comprising two side plates secured in facing relation by bracing at the top of said plates, a V-shaped support plate inclined downwardly and inwardly attached to and extending between the bottom portions of said side plates, a cutter plate detachably secured on each side of said support plate, and a flat shoe having a forwardly extending point secured in the center of said support, said shoe overlapping the inner edge portions of said cutter plates and clampingly engaging said cutter plates.

3. In a sub-soil plough, the combination comprising two side plates secured in facing relation by bracing at the top of said plates, said plates having inwardly turned bottom sections, said bottom sections having their rear edges closer together than their front edges, a V-shaped support plate inclined downwardly and inwardly attached near the bottom of said inwardly turned bottom sections, a cutter plate removably secured on each side of said support plate, and a flat shoe having a forwardly extending point secured in the center of said support plate and clampingly engaging said cutter plates.

4. A sub-soil plough, comprising two thin side plates secured in a facing position by bracing at the top of said plates, said plates having inwardly turned bottom sections with beveled forward edges, said bottom sections having their rear edges slightly closer together than their front edges, a V-shaped support plate inclined downwardly and inwardly attached near the bottom of said inwardly turned plate sections, fillet plates inclined downwardly and inwardly fastened in the corners formed by said inwardly turned plate sections and said support plate, a cutter plate removably secured on each side of said support plate, and a flat shoe having a forwardly extending point secured in the center of said support plate, heel plates secured to the bottom edges of said side plate beneath said support plate at the same angle as that between the cutting edge and said side plates and in planar prolongation of said cutting edge, and draw bar and thrust bar connections for said plough.

5. A sub-soil plough, comprising two thin plates secured in facing relation by bracing at the top of said plates, said plates having inwardly turned bottom sections with beveled forward edges, a V-shaped support plate inclined downwardly and inwardly attached near the bottom of said bottom sections, gusset plates inclined downwardly and inwardly fastened in the corners formed by said bottom sections and said support plate, a narrow cutter plate detachably secured on each side of said support plate and overlapping the forward portion thereof, said plates being secured at the upper ends against forward movement and to the forward edge of said support plate against rearward movement, a laminated shoe bowed downwardly with a forwardly extending point clamping said cutter plates to said support plate by means of downwardly extending lugs, said shoe being attached to the rear of said base plate so that when in clamped position it exerts a downward force through said lugs on said cutter plates, and heel plates secured to the bottom edge of said side plates beneath said support plate at the same depth as the portion of the cutter edges immediately in front of said heel plates.

6. A sub-soil plough, comprising two thin plates secured in facing relation by bracing at the top of said plates, said plates having inwardly turned bottom sections with beveled forward edges, a V-shaped support plate inclined downwardly and inwardly attached near the bottom of said bottom sections, gusset plates inclined downwardly and inwardly fastened in the corners formed by said bottom sections and said support plate, a cutter plate detachably secured on each side of said support plate and a flat shoe having a forwardly extending point secured in the center of said support, inwardly turned support flanges secured to the bottom edge of said side plates, heel plates secured beneath said support flanges, and a slidably mounted wedge plate secured between said support flanges and said heel plates, whereby the elevation of said heel plates can be adjusted.

7. In a sub-soil plough, the combination comprising two thin side plates secured in facing relation by bracing at the top of said plates, a V-shaped support plate inclined downwardly and inwardly attached to and extending between the bottom portions of said plates, gusset plates inclined downwardly and inwardly fastened in the corners formed by said side plates and said support plate, a narrow cutter plate detachably secured on each side of said support plate and overlapping the forward portion thereof, said plates being secured to the forward edge of said support plate against rearward movement and having upwardly turned outer end portions resting against said gusset plates and secured against forward movement by means of attachment bolts extending rearwardly from said upper end portions between said gusset plates and said side plates, a shoe member positioned centrally on said cutter plate and providing a bearing surface overlying both of said cutter plates, said shoe having an extension interlocking with the forward edge portion of said support plate and having tensioning means carried by its rear portion and acting against the rear edge of said support plate to clamp said shoe to said support plate and to cause the bearing surface of said shoe to press downwardly against said cutter plates.

References Cited in the file of this patent
UNITED STATES PATENTS

| Number | Name | Date |
|---|---|---|
| 124,810 | Goodwin | Mar. 19, 1872 |
| 145,627 | Clark | Dec. 16, 1873 |
| 326,462 | Torrey | Sept. 15, 1885 |
| 547,500 | Poole | Oct. 8, 1895 |
| 1,314,394 | Grimes | Aug. 26, 1919 |
| 1,894,516 | Karstedt | Jan. 17, 1933 |
| 1,909,752 | Calkins | May 16, 1933 |
| 2,154,970 | Briggs | Apr. 18, 1939 |
| 2,190,347 | Austin | Feb. 13, 1940 |